US011327390B2

(12) United States Patent
Narikawa et al.

(10) Patent No.: US 11,327,390 B2
(45) Date of Patent: May 10, 2022

(54) PROJECTION APPARATUS, INSTALLED STATE DETECTION METHOD AND INSTALLED STATE DETECTION PROGRAM

(71) Applicant: CASIO COMPUTER CO., LTD., Tokyo (JP)

(72) Inventors: Tetsuro Narikawa, Hamura (JP); Kazuyasu Fukano, Hachioji (JP); Hiroshi Saito, Akishima (JP); Shunsuke Hara, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 2 days.

(21) Appl. No.: 17/084,430

(22) Filed: Oct. 29, 2020

(65) Prior Publication Data
US 2021/0132479 A1    May 6, 2021

(30) Foreign Application Priority Data
Oct. 30, 2019    (JP) .............................. JP2019-197517

(51) Int. Cl.
*G03B 21/14*    (2006.01)
*H04N 9/31*    (2006.01)

(52) U.S. Cl.
CPC ......... *G03B 21/145* (2013.01); *G03B 21/142* (2013.01); *G03B 21/147* (2013.01); *H04N 9/317* (2013.01); *H04N 9/3185* (2013.01)

(58) Field of Classification Search
CPC ...... G03B 21/00; G03B 21/14; G03B 21/142; G03B 21/145; G03B 21/147; H04N 9/31; H04N 9/317; H04N 9/3185
(Continued)

(56) References Cited

U.S. PATENT DOCUMENTS

| 8,985,782 | B2* | 3/2015 | Yoshimura | ........... G03B 21/006 353/69 |
| 2011/0181846 | A1* | 7/2011 | Ozawa | ................... G03B 21/14 353/70 |
| 2014/0285778 | A1* | 9/2014 | Inoue | .................. H04N 9/3194 353/70 |

FOREIGN PATENT DOCUMENTS

| JP | 2007-214752 A | 8/2007 |
| JP | 2007-264405 A | 10/2007 |

(Continued)

OTHER PUBLICATIONS

JPO; Application No. 2019-197517; Notice of Reasons for Refusal dated Sep. 29, 2021.

(Continued)

*Primary Examiner* — William C. Dowling
(74) *Attorney, Agent, or Firm* — Fitch, Even, Tabin & Flannery LLP

(57) ABSTRACT

The present invention aims to make it possible to detect deterioration of a housing of a projection apparatus and to notify a user of the deterioration of the housing. The projection apparatus includes a projected image processing unit which registers a deformation parameter as an initial value in a case where the deformation parameter for a projected image is set as an initial setting to be made at the time of installation of the projection apparatus as a registration control unit. In a case where the deformation parameter for the projected image is adjusted by a user operation after the initial setting is made, the projected image processing unit decides whether an adjustment degree that the deformation parameter is adjusted from the initial value reaches a predetermined threshold value as a decision unit. In addition, in a case where the adjustment degree reaches the predetermined threshold value, the projected image (Continued)

processing unit gives a warning to the user at a predetermined timing as a notification control unit.

18 Claims, 7 Drawing Sheets

(58) Field of Classification Search
USPC .................................... 353/69, 70, 121, 122
See application file for complete search history.

(56) References Cited

FOREIGN PATENT DOCUMENTS

| | | |
|---|---|---|
| JP | 2010-49007 A | 3/2010 |
| JP | 2014-106410 A | 6/2014 |
| JP | 2014-212467 A | 11/2014 |
| JP | 2015-001582 A | 1/2015 |

OTHER PUBLICATIONS

JPO; Application No. 2019-197517; Decision of Refusal dated Dec. 8, 2021.

\* cited by examiner

PROJECTION APPARATUS, INSTALLED STATE DETECTION METHOD AND INSTALLED STATE DETECTION PROGRAM

CROSS-REFERENCE TO RELATED APPLICATIONS

This application is based upon and claims the benefit of priority under 35 USC 119 of Japanese Patent Application No. 2019-197517 filed on Oct. 30, 2019, the entire disclosure of which, including the description, claims, drawings, and abstract, is incorporated herein by reference in its entirety.

BACKGROUND OF THE INVENTION

1. Field of the Invention

The present invention relates to a projection apparatus, and an installed state detection method and an installed state detection program which are used in the projection apparatus.

2. Description of the Related Art

As described in Japanese Patent Application Laid-Open No. 2010-49007, a projection apparatus that an exterior housing is made of a synthetic resin and an installation member which is adapted to install an apparatus main body on a predetermined place is attached to the exterior housing is disclosed (Patent Literature 1).

BRIEF SUMMARY OF THE INVENTION

According to one aspect of the present invention, there is provided a projection apparatus including: at least one processor; and a notification device, wherein the processor performs the processes of, registering a deformation parameter for a projected image which is set at a timing that an initial setting is made, as an initial value, in a case where the deformation parameter is adjusted by a user at a timing which comes after the timing that the initial setting is made, deciding whether an adjustment degree that the deformation parameter is adjusted from the initial value reaches a first threshold value, and in a case where the adjustment degree reaches the first threshold value, controlling the notification device to notice a warning at a predetermined timing.

According to another aspect of the present invention, there is provided a method of detecting an installed state of a projection apparatus which includes at least one processor and a notification device, including: registering a deformation parameter for a projected image which is set at a timing that an initial setting is made, as an initial value; in a case where the deformation parameter is adjusted by a user operation at a timing which comes after the timing that the initial setting is made, deciding whether an adjustment degree that the deformation parameter is adjusted from the initial value reaches a first threshold value; and in a case where the adjustment degree reaches the first threshold value, controlling the notification device to notice a warning at the predetermined timing.

According to still another aspect of the present invention, there is provided a non-transitory computer readable medium in which a program used for controlling a computer of a projection apparatus wherein the program for making a computer execute the procedures of: registering a deformation parameter for a projected image which is set at a timing that an initial setting is made, as an initial value; in a case where the deformation parameter is adjusted by a user operation at a timing which comes after the timing that the initial setting is made, deciding whether an adjustment degree that the deformation parameter is adjusted from the initial value reaches a first threshold value; and in a case where the adjustment degree reaches the first threshold value, noticing a warning at the predetermined timing.

According to the present invention, it becomes possible to provide a projection apparatus, an installed state detection method and an installed state detection program which are configured to detect deterioration of a housing and to notify a user of the deterioration of the housing.

DETAILED DESCRIPTION OF THE INVENTION

In the following, a projection apparatus which is in the form (an embodiment) for embodying the present invention will be described. An image on a screen that the projection apparatus which is suspended from a ceiling projects diagonally from above is deformed into the form of a keystone that a lower side (a lower bottom) thereof becomes long in a case where no correction is made. Accordingly, the projection apparatus corrects the image on the screen into the form of a rectangle by performing geometric transformation which is called keystone correction (keystone distortion correction) on an input image and then projecting the input image on the screen. In the keystone correction, a correction amount (a keystone correction angle) is determined depending on a downward inclination angle (a projection angle) at which projection is performed on condition that the screen is vertical.

In a case where a crack is generated in a housing, the projection angle is changed and therefore the image on the screen is deformed into the form of a keystone and a user performs the keystone correction on the image. The projection apparatus according to the present embodiment gives a warning so as to check on the housing in a case where a difference between a keystone correction angle which is set when the projection apparatus is disposed (installed) in a state of being suspended from the ceiling and a keystone correction angle that the user sets exceeds a predetermined first threshold value (the first threshold value). In a case where the crack is generated in the housing and thereby the projection angle is changed, it becomes possible to call a user's attention by giving the warning in this way.

Further, in a case where the difference between the keystone correction angle which is set at the time of installation of the projection apparatus and the keystone correction angle that the user sets exceeds a predetermined second threshold value (the second threshold value) which is larger than the first threshold value, the projection apparatus stops the projection itself. It becomes possible to more strongly encourage the user so as to check on the projection apparatus in a case where a crack which is larger than the crack which was generated before is generated in the housing and the projection angle is greatly changed by stopping the projection in this way.

«Overall Configuration of Projection Apparatus»

Figure 1:
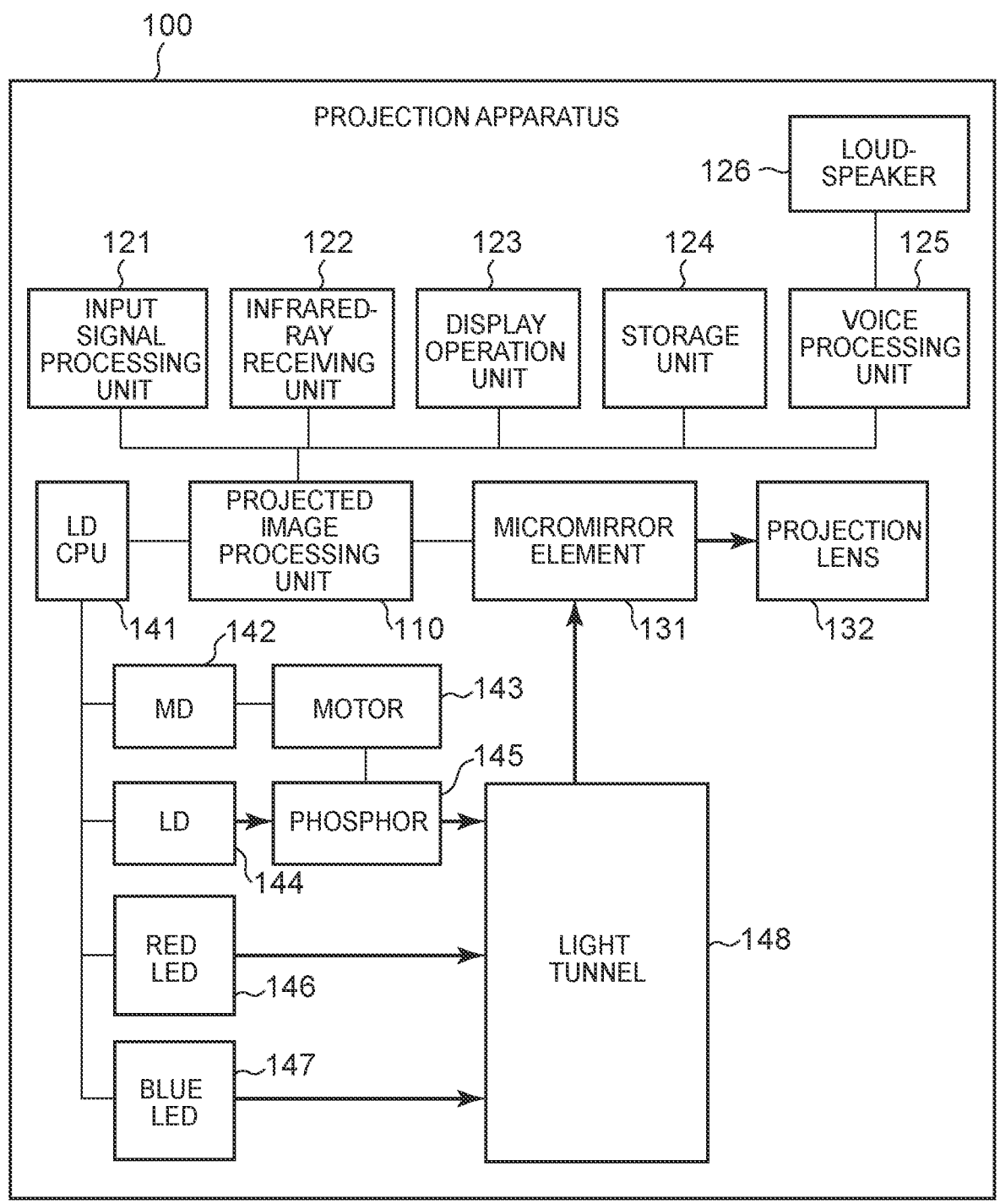
FIG. 1 is a functional block diagram illustrating one example of a projection apparatus according to one embodiment of the present invention.

FIG. 1 is a functional block diagram illustrating one example of a projection apparatus 100 according to one embodiment of the present invention. The projection apparatus 100 is a DLP (Digital Light Processing) (registered trade mark) system projector. The projection apparatus 100 includes a projected image processing unit (scaler) 110, an input signal processing unit 121, an infrared-ray receiving unit 122, a display operation unit 123, a storage unit 124, a voice processing unit 125, and a loudspeaker (a notification device) 126.

The input signal processing unit 121 outputs one of signals which are input from a VGA (Video Graphics Array) terminal, an HDMI (High-Definition Multimedia Interface) terminal and a VIDEO terminal to the projected image processing unit 110 as a digital image. Incidentally, the input signal processing unit 121 is capable of communicating with a terminal of an administrator, for example, via serial communications and is capable of accepting a command which is issued to the projection apparatus 100 and transmitting a message to the terminal of the administrator.

The projected image processing unit (the scaler) 110 configures a main CPU (Central Processing Unit) (a processor) of the projection apparatus 100 and is also described as a processing unit. In addition, the projected image processing unit 110 adjusts the number of resolutions, the number of gradations and so forth of an image that the input signal processing unit 121 outputs and performs transformation for correcting the distortions including the keystone correction on the image that the input signal processing unit 121 outputs and thereby generates an image of a predetermined form which is suited for projection. Further, the projected image processing unit 110 drives a micromirror element 131 which will be described later in time division in order to display the image which is generated in this way. Incidentally, the number of time divisions of a unit time is determined depending on a frame rate (for example, 120 frames/sec) which follows a predetermined format, the number of divisions of a color component, the number of gradations to be displayed and so forth.

The infrared-ray receiving unit 122 receives a control signal which is used for operating the projection apparatus 100 from a remote controller.

The display operation unit 123 includes an indicator which notifies the user of an operation of turning on/off of a power source and an error (an abnormality) in addition to buttons used for operating the projection apparatus 100. The storage unit 124 is configured by, for example, an EEPROM (Electrically Erasable Programmable Read-Only Memory), a flash memory and so forth and stores therein programs, set values and so forth which are used for controlling the projection apparatus 100. The voice processing unit 125 converts voice data which is incidental to the image that the input signal processing unit 121 outputs into an analog voice and amplifies and outputs the analog voice to the loudspeaker 126.

The projection apparatus 100 further includes an LD-CPU (Laser Diode Central Processing Unit) 141, a motor driver 142 (described as "MD" in FIG. 1), a motor 143, a laser diode 144 (described as "LD" in FIG. 1), a phosphor 145, a red LED (Light Emitting Diode) 146, a blue LED 147 and a light tunnel 148.

The LD-CPU 141 controls a light source. Describing in detail, the LD-CPU 141 drives the red LED 146 and the blue LED 147 and thereby red light and blue light are emitted and are made incident upon the light tunnel 148 which will be described later.

The LD-CPU 141 drives the laser diode 144 and thereby blue laser light is emitted. In addition, the LD-CPU 141 makes the motor driver 142 rotate the motor 143 and then rotate the phosphor 145 which is fixed to a rotating shaft of the motor 143. The blue laser light which is emitted from the laser diode 144 is excited by the phosphor 145 and becomes green light and then is made incident upon the light tunnel 148.

The projection apparatus 100 further includes a micromirror element 131 and a projection lens 132. Three streaks of light of primary colors, that is, the red light, the blue light and the green light which are made incident upon the light tunnel 148 are emitted to the micromirror element 131.

The micromirror element 131 includes micromirrors which are arranged in an array (for example, 1280 x 800). Each micromirror performs an on/off operation at a high speed so as to reflect light which is incident upon the micromirror from the light tunnel 148 toward the projection lens 132 or to turn the light away from the projection lens 132 and thereby forms a light image. The light image which is formed in this way is projected on a screen 250 (see FIG. 3 which will be described later) through the projection lens 132. Incidentally, the micromirror element 131 and the projection lens 132 are also termed as a projection unit by putting them together.

Figure 2:
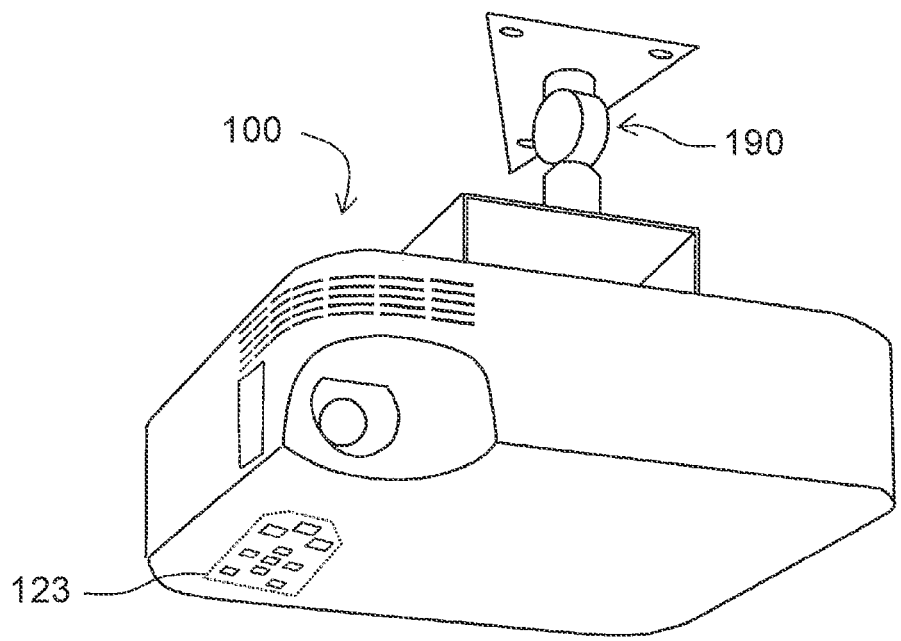
FIG. 2 is an outside view illustrating one example of the ceiling-suspended projection apparatus according to the present embodiment.

FIG. 2 is an outside view illustrating one example of the ceiling-suspended projection apparatus 100 according to the present embodiment. The projection apparatus 100 is installed in a state of being suspended from a ceiling 200 upside down via a suspension metal fitting 190 which is attached between the ceiling 200 and the projection apparatus 100. In this case, the display operation unit 123 faces downward.

«Keystone Correction of Projected Image»

Figure 3:
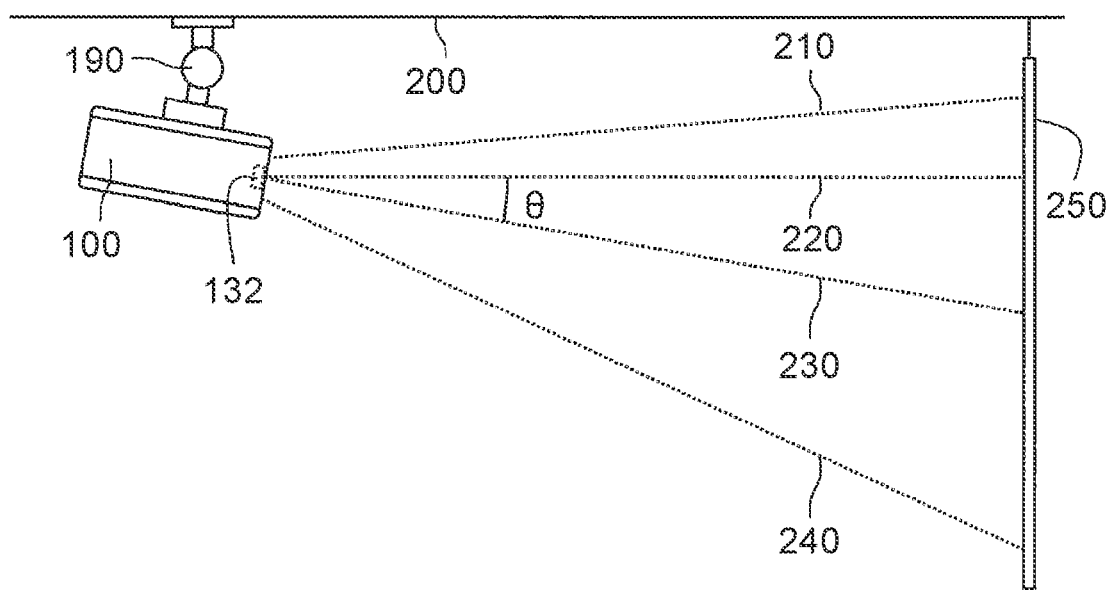
FIG. 3 is an explanatory diagram illustrating one example of a front-back direction inclination of the ceiling-suspended projection apparatus according to the present embodiment.

FIG. 3 is an explanatory diagram illustrating one example of a front-back direction inclination of the ceiling-suspended projection apparatus 100 according to the present embodiment. The projection apparatus 100 is suspended from the ceiling 200 via the suspension metal fitting 190 which is attached between the ceiling 200 and the projection apparatus 100. The projection apparatus 100 is located at a position (a height) which is close to the ceiling 200 and therefore is installed in a state of being inclined downward at an angle $\theta$ from the horizontal. Describing in detail, the projection apparatus 100 is installed in a state of facing downward in such a manner that the angle $\theta$ (that is, a projection angle (a depression angle)) is made between the front-back direction (see a dotted line 230) and a horizontal direction (see a dotted line 220).

Figure 4:
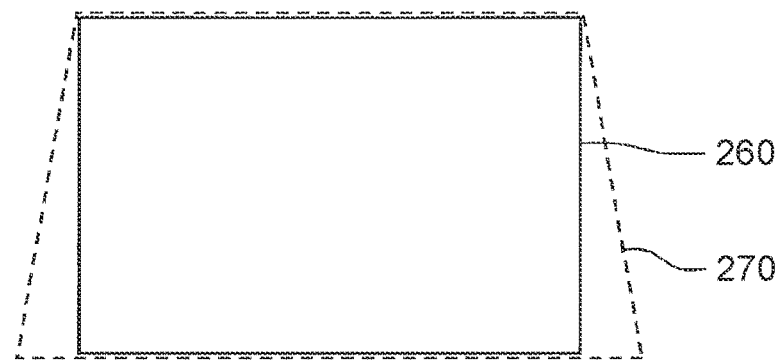
FIG. 4 is an explanatory diagram illustrating one example of keystone correction of a projected image in the projection apparatus according to the present embodiment.

FIG. 4 is an explanatory diagram illustrating one example of the keystone correction of the projected image in the projection apparatus 100 according to the present embodiment. The keystone correction will be described with reference to FIG. 3 and FIG. 4. In a case where the projection apparatus 100 projects an input image on the screen 250 (see FIG. 3) with no correction, the image which is projected on the screen 250 is deformed into an image 270 which is in the form of a keystone. This is because a path of light (see a dotted line 240) which is emitted from the projection lens 132 and forms a lower side of the image 270 on the screen 250 spreads sideways (is distorted) by a length which is longer than the length of a path of light (see a dotted line 210) which forms an upper side of the image 270. The projected image processing unit 110 performs the keystone correction on the input image in order to correct the distortion and to reform the image 270 into an image 260 which is in the form of a rectangle. Since a correction amount is determined depending on the projection angle $\theta$, the correction amount is also described as a keystone correction angle.

«Change in Keystone Correction Angle»

In a case where the projection apparatus 100 is suspended from the ceiling 200, in general, the position of the projection apparatus 100 and the projection angle are not changed until the projection apparatus 100 is dismounted. However, in a case where the crack is generated in the housing of the projection apparatus 100, the projection angle is changed. For example, in a case where the crack is generated in a part of the housing which is located in front of a position where the suspension metal fitting 190 is attached, the projection angle $\theta$ is more increased. Although the possibility that the user may notice the crack itself is low, it is easy for the user to notice a distortion of the projected image. Accordingly, the user operates the projection apparatus 100 and adjusts (sets) the keystone correction angle so as to be more increased. Incidentally, although it is also possible to operate the projection apparatus 100 by using the buttons on the display operation unit 123 (see FIG. 1 and FIG. 2) for setting the keystone correction angle, in general, the remote controller (see the infrared-ray receiving unit 1222 in FIG. 1) is used because the projection apparatus 100 is in a ceiling-suspended state. In addition, it is also possible to set the keystone correction angle by sending a command to the projection apparatus 100.

Figure 5:
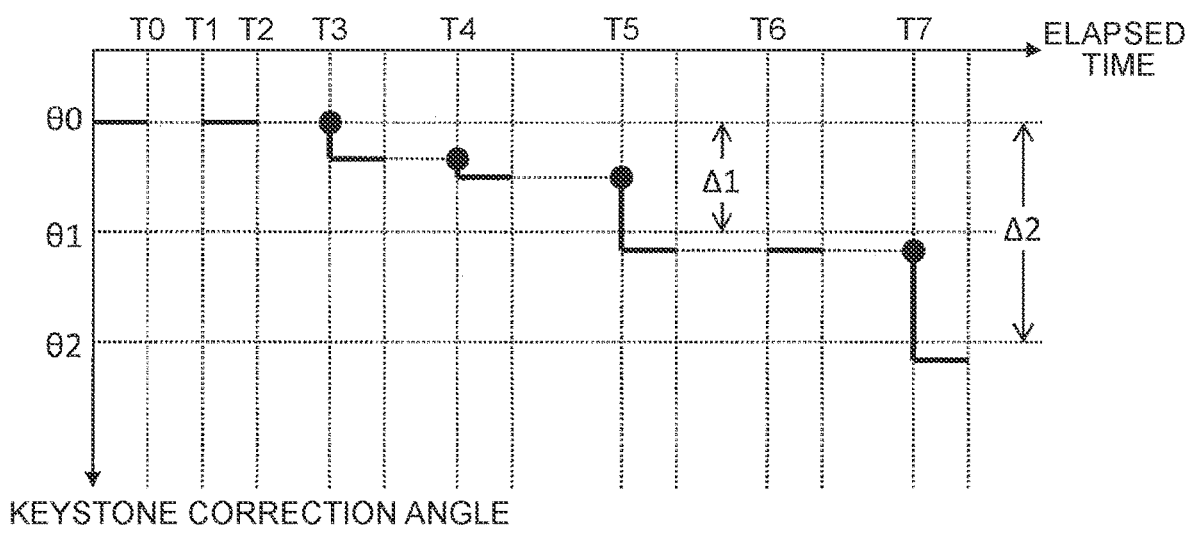
FIG. 5 is a graph illustrating one example of a change in keystone correction angle in the projection apparatus according to the present embodiment.

FIG. 5 is a graph illustrating one example of a change in keystone correction angle in the projection apparatus 100 according to the present embodiment. In the graph, the horizontal axis indicates a time which elapses after installation of the projection apparatus 100 and the vertical axis indicates the keystone correction angle. The keystone correction angle is more increased as it goes downward. A bold line indicates the keystone correction angle in a state where the power source of the projection apparatus 100 is turned on and a black circle indicates adjustment (setting) of the keystone correction angle by the user. For example, the power source is turned off in a period between a time T0 and a time T1 and is turned on in a period between the time T1 and a time T2. In addition, although the keystone correction angle remains $\theta 0$ which is the angle at the time of installation of the projection apparatus 100 up to the time T2, the keystone correction angle is adjusted so as to gradually increase at times T3, T4, T5 and T7. It is thought that the projection angle of the projection apparatus 100 begins to increase before the time T3.

«Housing Deterioration Detection Processing»

Figure 6:
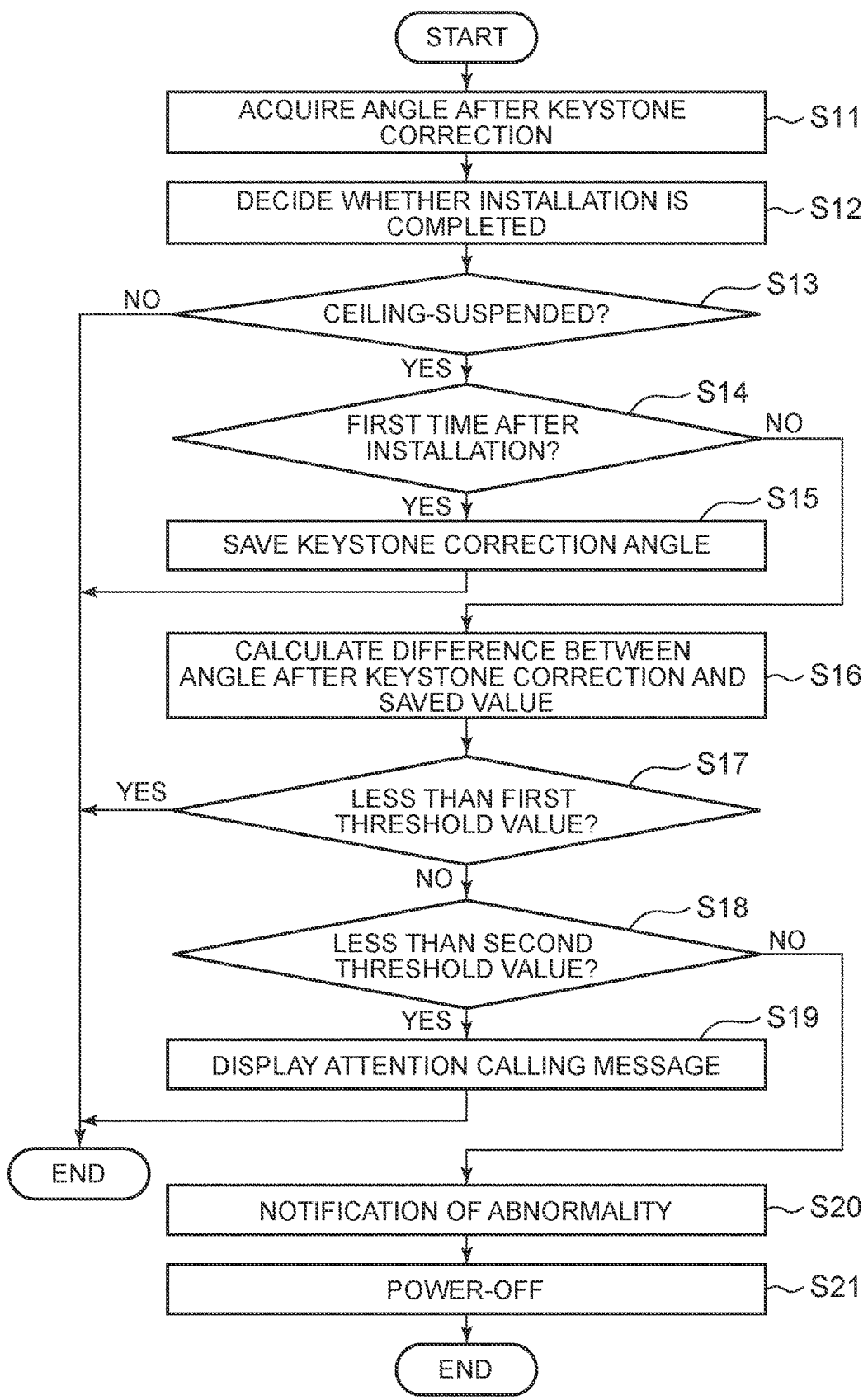
FIG. 6 is a flowchart illustrating one example of housing deterioration detection processing in the projection apparatus according to the present embodiment.

FIG. 6 is a flowchart illustrating one example of the housing deterioration detection processing in the projection apparatus 100 according to the present embodiment. The housing deterioration detection processing that the projected image processing unit 110 (the processing unit) executes and the keystone correction angle is utilized will be described with reference to FIG. 6. Incidentally, the housing deterioration detection processing is executed in a case where the user adjusts the keystone correction angle.

In step S11, the projected image processing unit 110 acquires the keystone correction angle which is obtained after the keystone correction is performed from the storage unit 124.

In step S12, the projected image processing unit 110 decides whether installation of the projection apparatus 100 is completed. Describing in detail, the projected image processing unit 110 acquires a value of an installation completion flag which is stored in the storage unit 124 and indicates completion of the installation. Incidentally, setting (updating) of the installation completion flag will be described later.

In step S13, in a case where ceiling-suspended projection (projection which is performed in a state of reversing vertically and horizontally) is set (YES), the projected image processing unit 110 proceeds to step S14. In a case where the ceiling-suspended projection is not set (NO), the projected image processing unit 110 terminates execution of the housing deterioration detection processing.

In step S14, in a case where the installation of the projection apparatus 100 is completed (the installation completion flag is set to YES) and, in addition, a keystone correction process to be executed this time is the process which is executed first after completion of the installation of the projection apparatus 100 (YES), the projected image processing unit 110 proceeds to step S15. In a case where this process is not the process which is executed first after completion of the installation of the projection apparatus 100 (NO), the projected image processing unit 110 proceeds to step S16.

In step S15, the projected image processing unit 110 saves the current keystone correction angle into the storage unit 124 as the keystone correction angle which is obtained at the time of installation of the projection apparatus 100 (see $\theta 0$ in FIG. 5). That is, in a case where the keystone correction angle which is used as a deformation parameter for the projected image is set as one of initial settings to be executed at the time of installation of the projection apparatus 100, the projected image processing unit 110 functions as a registration control unit and registers the deformation parameter which is set in this way as an initial value.

In step S16, the projected image processing unit 110 calculates a difference (the adjustment degree) between the installation-time keystone correction angle which is saved in the storage unit 124 in step S15 and the keystone correction angle which is acquired in step S11. In a case where the deformation parameter for the projected image is adjusted by a user's operation after execution of the initial settings, the projected image processing unit 110 functions as a decision unit and decides whether the adjustment degree that the deformation parameter is adjusted from the initial value reaches a predetermined threshold value. The initial value is a value obtained in a case where the deformation parameter value which is adjusted in this way does not change for a predetermined time period.

In step S17, in a case where the difference which is calculated in step S16 is less than a first threshold value (YES), the projected image processing unit 110 terminates execution of the housing deterioration detection processing. In a case where the difference exceeds the first threshold value (NO), the projected image processing unit 110 proceeds to step S18. Incidentally, the first threshold value is $\Delta 1$ in FIG. 5.

In step S18, in a case where the difference which is calculated in step S16 is less than a second threshold value (YES), the projected image processing unit 110 proceeds to step S19. In a case where the difference exceeds the second threshold value (NO), the projected image processing unit 110 proceeds to step S20. Incidentally, the second threshold value is $\Delta 2$ in FIG. 5.

In step S19, in a case where a predetermined time period elapses after projection of the image including projection of an attention-calling message (300 in FIG. 7), the projected image processing unit 110 suspends projection of the attention-calling message and projects the image which is input into the projection apparatus 100 on the screen 250. The projected image processing unit 110 may either call a user's attention in a voice over the loudspeaker 126 or call an administrator's attention via communications. The projected image processing unit 110 functions as a notification control unit and notifies the user and the administrator of the attention-calling message 300 at a predetermined timing in a case where the projected image processing unit 110 functions as the decision unit and decides that the adjustment degree reaches the predetermined threshold value concerned in this way. The predetermined timing is a time which comes immediately after the adjustment degree reaches the predetermined threshold value concerned or a time that the power source is turned on next.

Figure 7:
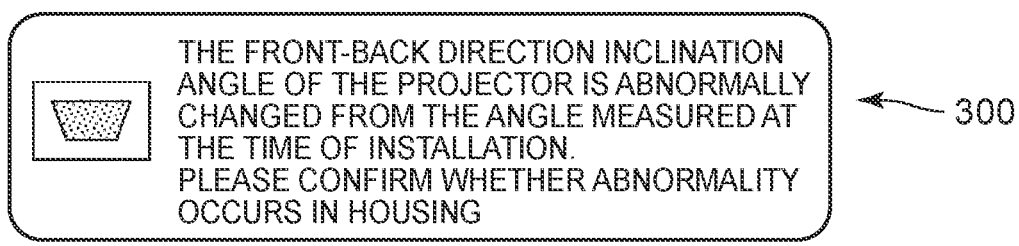
FIG. 7 is a diagram illustrating one example of an attention calling message in the projection apparatus according to the present embodiment.

FIG. 7 is a diagram illustrating one example of the attention-calling message 300 in the projection apparatus 100 according to the present embodiment. The attention-calling message 300 is issued in order to call the user's attention and to encourage the user to see whether the abnormality occurs in the housing of the projection apparatus 100.

A description will be made by returning to the flowchart in FIG. 6. In step S20, the projected image processing unit 110 notifies the user of occurrence of the abnormality. The projected image processing unit 110 notifies the user of occurrence of the abnormality by using, for example, a notification method of projecting a warning message on the screen 250, a notification method of flickering an indicator of the display operation unit 123 (see FIG. 2), a notification method of using the voice over the loudspeaker 126, a notification method of sending a notification to devices of the administrator and the user via communications and so forth. That is, the projected image processing unit 110 or the loudspeaker 126 operates as a notification device which notifies the administrator and the user of occurrence of the abnormality by sending the notification and so forth to the devices of the administrator and the user.

In step S21, the projected image processing unit 110 turns the power source of the projection apparatus 100 off.

《Characteristics of Housing Deterioration Detection Processing》

The characteristics of the housing deterioration detection processing in FIG. 6 will be described with reference to FIG. 5. The housing deterioration detection processing is executed every time that the keystone correction angle is adjusted (set). In a case where the keystone correction angle which is obtained after setting (adjustment) has a value between $\theta 1$ and $\theta 2$, the difference (see step S16 in FIG. 6) between the keystone correction angle which is obtained after adjustment (setting) and the keystone correction angle which is set at the time of installation of the projection apparatus 100 has a value between the first threshold value ($\Delta 1$) and the second threshold value ($\Delta 2$) and the projection apparatus 100 projects and displays the attention-calling message 300 (see FIG. 7) on the screen 250 (step S19 in FIG. 6). At this time point, a change in projection angle of the projection apparatus 100 is small and therefore even in a case where the crack is generated in the housing, the crack is thought to be small. Even in a case where a defect is found as a result of inspection of the housing by the user or the administrator, it is possible to continuously use the projection apparatus 100 until the next opportunity for repairment or replacement comes.

In a case where the keystone correction angle exceeds $\theta 2$ and the difference between this keystone correction angle and the keystone correction angle at the time of installation of the projection apparatus 100 exceeds the second threshold value ($\Delta 2$), the projected image processing unit 110 turns the power source of the projection apparatus 100 off so as to immediately avoid utilization of the projection apparatus 100 (see step S21). As a result, the user or the administrator comes to repair or replace the projection apparatus 100.

Incidentally, in FIG. 5, an example that the projection angle $\theta$ changes so as to increase due to generation of the crack in the part of the housing which is located in front of the position where the suspension metal fitting 190 (see FIG. 2) is attached is illustrated. Also in a case where the projection angle $\theta$ changes so as to decrease due to generation of the crack in a part of the housing which is located behind the position where the suspension metal fitting 190 is attached, it is possible to detect the crack by executing the housing deterioration detection processing in FIG. 6. Incidentally, the first threshold values and the second threshold values may be made different from each other respectively between the change that the projection angle is increased and the change that the projection angle is decreased.

《Installation Completion Flag》

There is a plurality of methods that the projection apparatus 100 (the projected image processing unit 110) detects completion of installation of the projection apparatus 100 and sets the installation completion flag to YES. In the following, one example thereof will be described.

In a case where the projected image processing unit 110 accepts an installation completion operation via settings or in the form of a command, the projected image processing unit 110 sets the installation completion flag to YES. The settings are executed by using the display operation unit 123 and the remote controller. In addition, the command is used for giving instructions from a terminal that the administrator uses to the projection apparatus 100 via communications.

Figure 8:
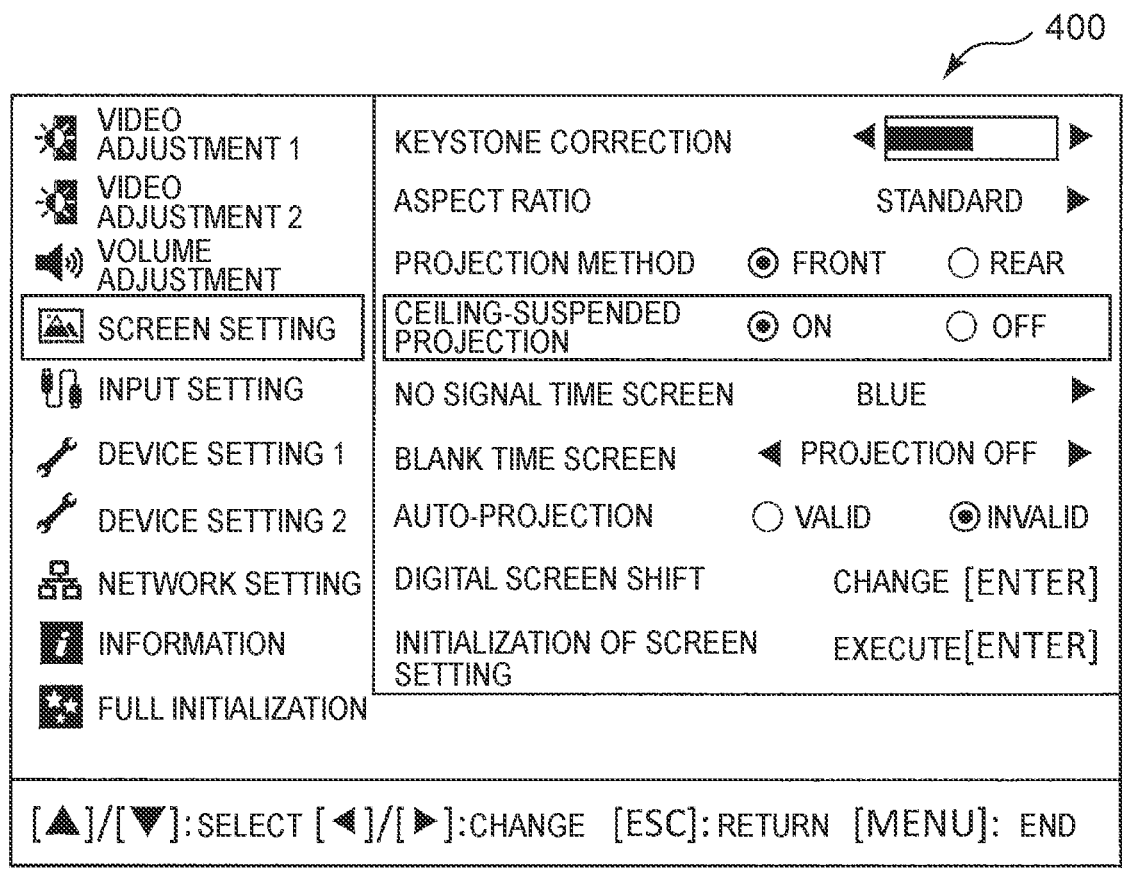
FIG. 8 is a diagram illustrating one example of a setting menu including a ceiling suspension setting in the projection apparatus according to the present embodiment.

FIG. 8 illustrates one example of a setting menu 410 which includes a ceiling suspension setting screen. In a case of the ceiling suspension setting screen such as that illustrated in FIG. 8, a setting of ceiling-suspended projection is executed by selecting "Screen Setting" from menu items and then selecting "On" in "Ceiling-Suspended Projection", then a dialogue in the setting menu 410 is closed by pushing an [ESC] key and then the setting menu 410 is closed by pushing a [MENU] key. Thereafter, in a case where the projected image processing unit 110 accepts power-off, it becomes possible for the projected image processing unit 110 to set the installation completion flag to YES. Incidentally, even in a where the projected image processing unit 110 accepts the power-off after performing the keystone correction, corner correction which will be described later and so forth and completing setting of deformation parameters for projected images in the keystone correction, the corner correction and so forth as initial settings to be executed at the time of installation of the projection apparatus 100 after the setting of ceiling-suspended projection is executed, it becomes also possible for the projected image processing unit 110 to set the installation completion flag to YES.

Figure 9:
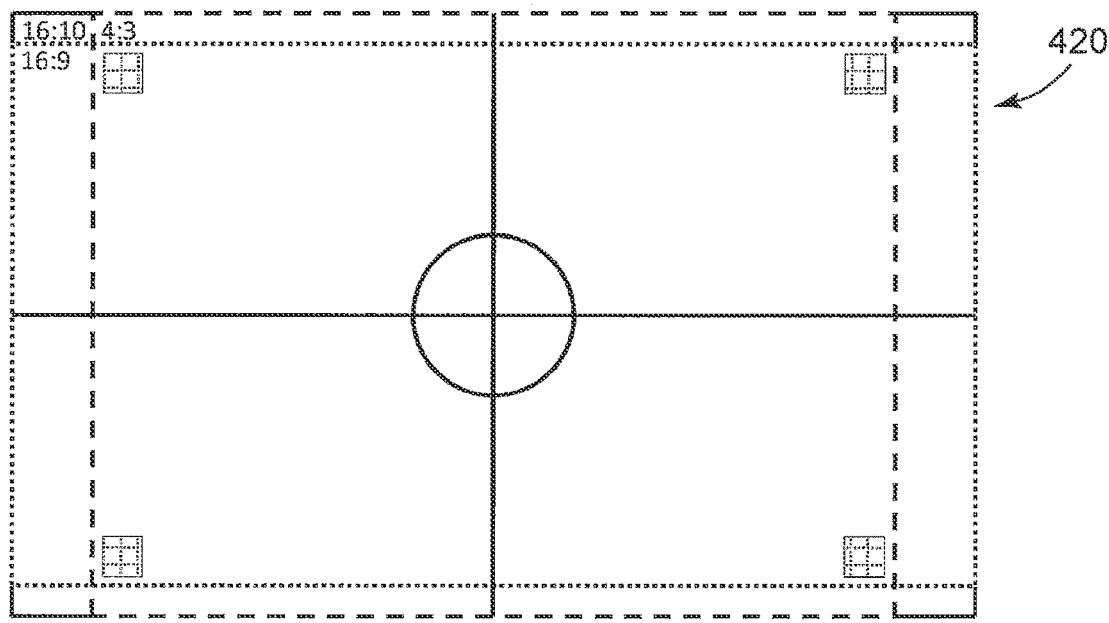
FIG. 9 is a diagram illustrating one example of a projection screen of a built-in pattern for installation in the projection apparatus according to the present embodiment.

Next, FIG. 9 illustrates one example of a projection screen of a built-in pattern for installation 420. An installer who installs the projection apparatus 100 selects "Screen Setting" in the items of the setting menu 410 (see FIG. 8) and then selects "No Signal Time Screen". Next, the installer selects "Test Pattern" (not illustrated) which is the built-in pattern for installation 420 from "Blue", "Black", "Logo" and "Test Pattern" (not illustrated except "Blue") as the projection screen to be displayed in the absence of a signal which is input into the projector. In a case where the power-off is accepted after projection of the built-in pattern for installation 420 such as that illustrated in FIG. 9, it becomes possible for the projected image processing unit 110 to set the installation completion flag to YES.

Figure 10A:
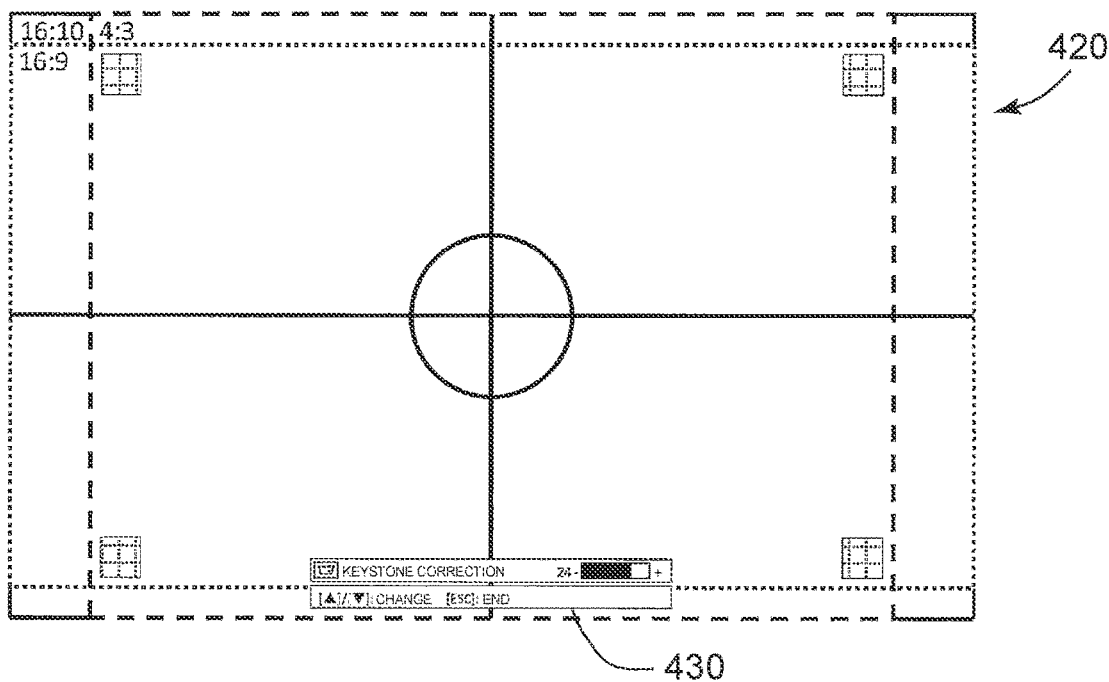
FIG. 10A is a diagram illustrating one example of the built-in pattern for installation which includes a dialog for the keystone correction in the projection apparatus according to the present embodiment.
Figure 10B:
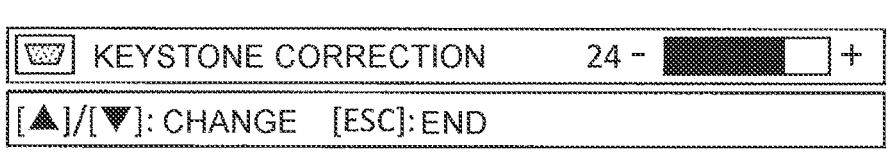
FIG. 10B is a diagram illustrating one example of the dialog for the keystone correction in the projection apparatus according to the present embodiment.

FIG. 10A and FIG. 10B illustrate examples of keystone correction angle setting screens. After projection of the built-in pattern for installation 420 in FIG. 9 is performed, the keystone correction angle is set. FIG. 10B is an enlarged diagram of a keystone correction dialogue 430 in FIG. 10A. The installer adjusts the keystone correction angle by regulating a horizontal bar in a + direction or a − direction. Specifically, the installer corrects a longitudinal keystone distortion corrected by pushing a ▲ key or a ▼ key on a projector body. As an alternative, the installer corrects the longitudinal keystone distortion by pushing a [KEYSTONE +] key or a [KEYSTONE −] key (not illustrated) of the remote controller. Then, the installer closes the keystone correction dialog 430 by pushing the [ESC] key. Then, the projected image processing unit accepts the power-off and then sets the installation completion flag to YES.

Figure 11A:
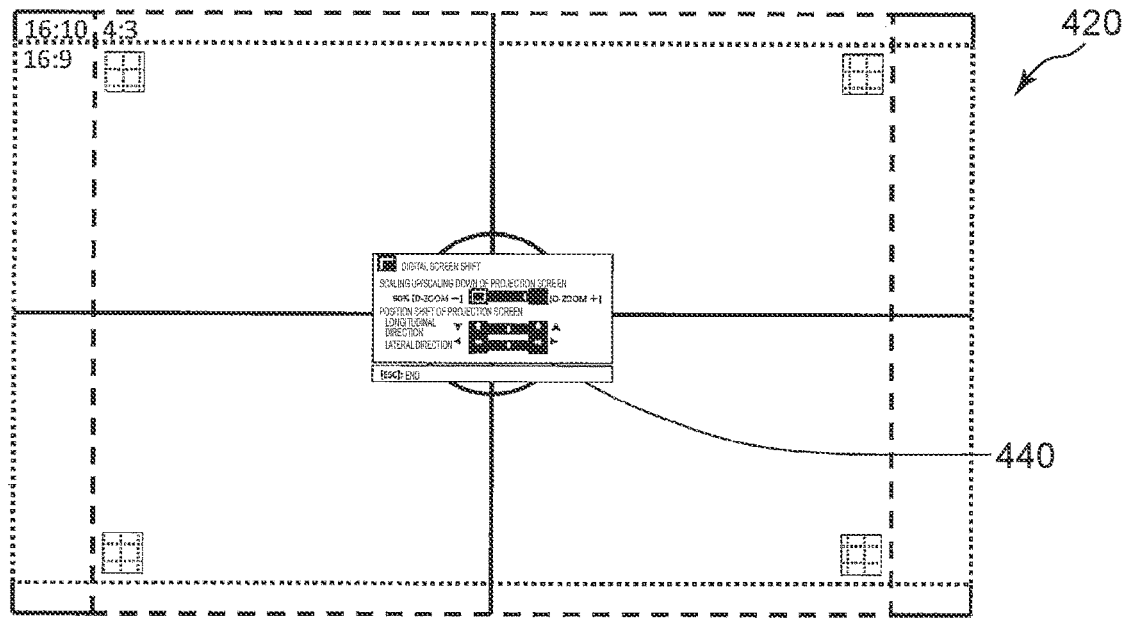
FIG. 11A is a diagram illustrating one example of the built-in pattern for installation which includes a "Digital Screen Shift" dialog in the projection apparatus according to the present embodiment.
Figure 11B:
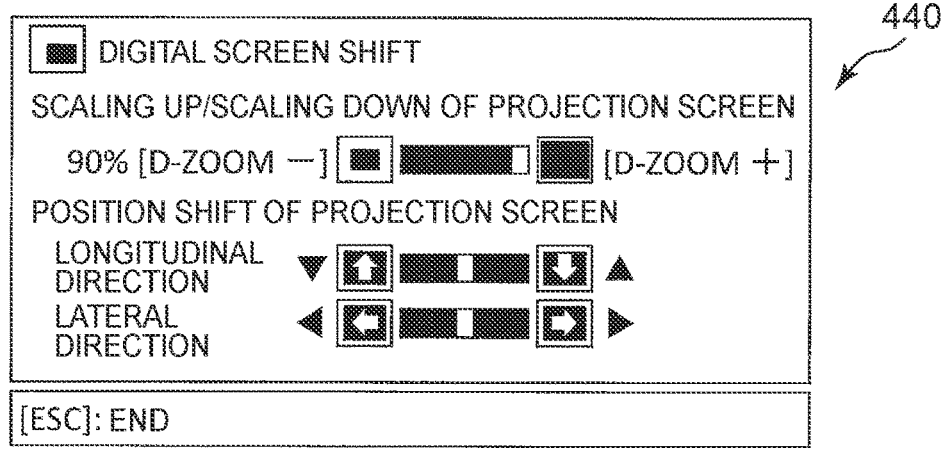
FIG. 11B is a diagram illustrating one example of the "Digital Screen Shift" dialog in the projection apparatus according to the present embodiment.

FIG. 11A and FIG. 11B illustrate examples of a digital screen shift setting screen. FIG. 11B is an enlarged diagram of a "Digital Screen Shift" dialogue 440 in FIG. 11A. The digital screen shift makes it possible to reduce the size of the projection screen in length-to-width equal ratio and to shift a projection position upward downward, leftward and rightward and is useful in a case where it is wished to adjust a projection size and the projection position in a state where the projector is fixed.

After projection of the built-in pattern for installation 420 in FIG. 9 is performed, the installer sets the digital screen shift. The installer displays the setting menu 410 (see FIG. 8) by pushing the [MENU] key of the display operation unit 123 or the remote controller. Then, the installer selects the menu in order of "Screen Setting"→"Digital Screen Shift"→"Change of Digital Screen Shift" and then pushes an [ENTER] key. Then, the "Digital Screen Shift" dialogue 440 which is illustrated in FIG. 11A and FIG. 11B is displayed.

Then, the installer adjusts the size of the projection screen to a value which is less than 100% by using a [D-ZOOM −] key and a [D-ZOOM +] key. In a case where the size of the projection screen is changed to a value which is less than 100%, position shifting of the projection screen becomes possible. In a case where it is wished to shift the position of the projection screen, the installer adjusts the position by pushing the ▲ key or the ▼ key for longitudinal shifting. In addition, the installer adjusts the position of the projection screen by pushing a left-pointing triangle key or a right-pointing triangle key for lateral shifting. In a case where adjustment of position shifting of the projection screen is terminated or in a case where the size of the projection screen is 100% and therefore the position of the projection screen is not shifted, the installer closes the "Digital Screen Shift" dialogue 440 by pushing the [ESC] key and then closes the setting menu 410 (see FIG. 8) by pushing the [MENU] key. Thereafter, the projected image processing unit 110 accepts the power-off and then sets the installation completion flag to YES.

In a case where the integrated projection time or the number of times that the power source is turned on exceeds a predetermined value, the projected image processing unit 110 may set the installation completion flag to YES. In general, the projection apparatus 100 is installed in the ceiling-suspended state after factory shipment and therefore in the case where the integrated projection time or the number of times that the power source is turned on exceeds the predetermined value, it is possible to decide that the projection apparatus 100 is installed.

In a case where the integrated projection time or the number of times that the power source is turned on which is obtained after final acceptance of installation-related settings exceeds the predetermined value, the projected image processing unit 110 may set the installation completion flag to YES. The installation-related settings include some or all of a keystone correction setting, a ceiling-suspended projection setting, a rear projection setting, a digital screen shift setting, a zoom setting, a focus setting and an installation environment setting. Although these settings are executed at the time of installation of the projection apparatus 100, there are cases where the settings are finely adjusted later. In a case where the integrated projection time or the number of times that the power source is turned on which is obtained after final adjustment of these settings exceeds the predetermined value, ii is possible to decide that the installation of the projection apparatus 100 is completed.

《Modification: Housing Deterioration Detection Using Corner Correction》

In the above embodiment, the deterioration of the housing is detected by detecting a change in front-back direction inclination of the projection apparatus 100 on the basis of adjustment of the keystone correction angle. However, in a case where the projection apparatus 100 has a geometry correction function for the corner correction which makes it possible to adjust distortions at four corners of the projection screen respectively, it is possible to use, as the initial setting, not the keystone correction angle setting for the projected image but a corner correction value setting for the projected image as the deformation parameter. In this case, deterioration of the housing is detected by detecting a change in left-right direction inclination of the projection apparatus 100 on the basis of adjustment of each corner correction value.

Figure 12:
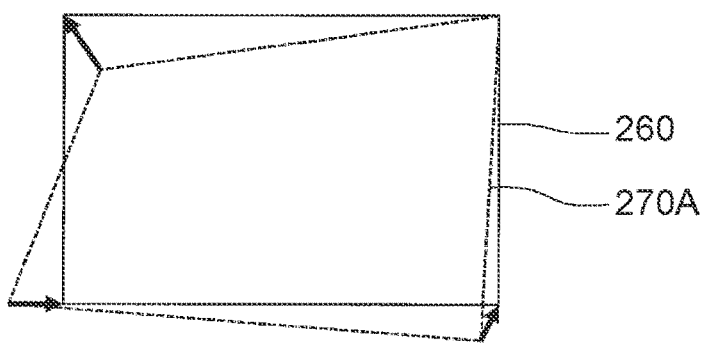
FIG. 12 is an explanatory diagram illustrating one example of corner correction of the projected image in a modification of the present embodiment.

FIG. 12 is an explanatory diagram illustrating one example of the corner correction of the projected image in a modification of the present embodiment. In a case where the projection apparatus 100 projects an image in an inclined state or projects the image diagonally from the side and then the input image is not corrected, a quadrangle image 270A such as that illustrated in FIG. 12 is formed. In such a case, it is possible to correct the image 270A to an image 260 which is corrected into the form of a rectangle by performing the corner correction (see bold arrows in FIG. 12) that correct positions of the four corners are designated by shifting the positions upward, downward, leftward and rightward respectively. That is, the user selects the corner correction as the item of the geometry correction function from a menu screen so as to project a quadrangle screen which indicates the projection screen, selects a place to be adjusted in the four corners by using the remote controller and corrects the distortion by pushing the button on the remote controller until the distortion is removed.

In a case where the left-right direction inclination of the projection apparatus 100 is changed, the user performs the corner correction such that heights of the both corners of an upper side of the image and heights of the both corners of a lower side of the image become the same as each other respectively. Accordingly, it becomes possible to detect a change in left-right direction inclination of the projection apparatus 100 by comparing a difference between height correction amounts in a vertical direction of the both corners of the upper side or the lower side of the image with a difference in height between the both corners at the time of installation of the projection apparatus 100.

Describing in detail, it becomes possible to detect the change in left-right direction inclination by executing the housing deterioration detection processing in FIG. 6 in a form that the keystone correction angle is replaced with the difference in vertical-direction correction amount between the both corners of the upper side. As alternatives, a difference in vertical-direction correction amount between the both corner of not the upper side but the lower side and one difference which is larger than the other difference between the difference in vertical-direction correction amount between the both corners of the upper side of the image and the difference in vertical-direction correction amount between the both corners of the lower side of the image may be used.

In a case where the deformation parameter for the projected image is set as the initial setting at the time of installation of the projection apparatus 100, when the projected image processing unit 110 functions as the registration control unit and registers the set deformation parameter as the initial value in this way, it is possible to use either the keystone correction angle of the projected image which is described in the present embodiment or the corner correction value of the projected image which is described in the modification as the deformation parameter.

«Other Modifications»

In the embodiment, the projection apparatus 100 is suspended from the ceiling 200 (see FIG. 3). It is possible for the projection apparatus 100 to detect the inclination of the housing from the keystone correction angle by executing the housing deterioration detection processing in FIG. 6 and to call the attention similarly also in a case where the projection apparatus 100 is installed in a state of being suspended from a metal fitting which is fixed to a wall.

In addition, although in the embodiment, the projection apparatus 100 is configured that the notification control unit (that is, the projected image processing unit 110) notifies the user of the warning in the form of the message in the image which is projected on the screen 250 as the method of notifying the user of the warning at the predetermined timing, the present invention is not limited to this configuration.

For example, the projection apparatus 100 may include a display unit so as to display the message on the display unit.

The projection apparatus 100 according to the embodiment includes the processor (the projected image processing unit 110) and the notification device (the loudspeaker 126). The processor registers the deformation parameter which is set for the projected image at the time of execution of the initial settings as the initial value, in a case where the deformation parameter is adjusted at the timing which comes after the timing that the initial settings are executed, decides whether the adjustment degree that the deformation parameter is adjusted from the initial value reaches the first threshold value, and in a case where the adjustment degree reaches the first threshold value, controls the notification device so as to give the warning to user. Accordingly, it becomes possible to detect that a part of the resinous housing of the projection apparatus 100 to which the ceiling suspension metal fitting 190 is attached and a load is applied the most begins to deteriorate at an early stage. Therefore, for example, in a case where the projection apparatus 100 is installed in a highly oily environment, there is a fear that the exterior housing which is made of the synthetic resin may be deteriorated before the user becomes aware of deterioration. However, according to the present invention, it becomes possible to notify the user and others of possibility of deterioration of the housing before the entire housing is deteriorated. Incidentally, although in the embodiment, an example that the projection apparatus 100 is configured to be suspended from the ceiling 200 (see FIG. 3) is given, the configuration of the projection apparatus 100 is not limited to the configuration in the example. For example, the projection apparatus 100 may be installed in a state of being suspended from the metal fitting which is fixed to the wall.

Although the embodiment and the several modifications thereof are described above, these embodiment and modifications are merely examples and do not limit the technical scope of the present invention. It is possible for the present invention to assume various other embodiments. Further, various alterations such as omissions, replacements and so forth are possible within the range not deviating from the gist of the present invention. The embodiment and the modifications thereof are included in the scope and the gist of the present invention which is described in the present specification and so forth and included in the scopes of the invention and equivalents thereof which are described in WHAT IS CLAIMED IS.

What is claimed is:

1. A projection apparatus comprising:
    at least one processor; and
    a notification device, wherein
    the processor performs the processes of,
        registering a deformation parameter for a projected image which is set at a timing that an initial setting is made, as an initial value,
        in a case where the deformation parameter is adjusted by a user at a timing which comes after the timing that the initial setting is made, deciding whether an adjustment degree that the deformation parameter is adjusted from the initial value reaches a first threshold value, and in a case where the adjustment degree reaches the first threshold value, controlling the notification device to notice a warning at a predetermined timing.

2. The projection apparatus according to claim 1, wherein in a case where the deformation parameter for the projected image is set as the initial setting to be made at the time of installation of the projection apparatus, the processor registers the deformation parameter which is set as the initial value.

3. The projection apparatus according to claim 1, wherein the deformation parameter includes at least one of a keystone correction angle and a corner correction value.

4. The projection apparatus according to claim 1, wherein the initial value is obtained in a case where an adjusted value of the deformation parameter does not change for a predetermined period of time.

5. The projection apparatus according to claim 1, wherein in a case where the adjustment degree reaches the first threshold value, the processor controls the notification device to notice the warning immediately after the adjustment degree reaches the first threshold value or in a case where a power source is turned on the next time.

6. The projection apparatus according to claim 1, wherein the warning is noticed with sound or in the form of a message in an image that the projection apparatus projects.

7. The projection apparatus according to claim 1, wherein in a case where the adjustment degree that the deformation parameter is adjusted from the initial value becomes more than a second threshold value which is more than the first threshold value, the processor stops an operation of the projection apparatus.

8. The projection apparatus according to claim 2, wherein in a case where the processor accepts an installation completion operation, the processor decides that installation of the projection apparatus is completed.

9. The projection apparatus according to claim 2, wherein in a case where the processor accepts a power source turning-off operation which is performed first after switching to a ceiling suspension setting, the processor decides that installation of the projection apparatus is completed.

10. The projection apparatus according to claim 2, wherein in a case where the processor accepts a power source turning-off operation which is performed first after projection of a built-in pattern for installation, the processor decides that installation of the projection apparatus is completed.

11. The projection apparatus according to claim 2, wherein in a case where an integrated projection time exceeds a predetermined time, the processor decides that installation of the projection apparatus is completed.

12. The projection apparatus according to claim 2, wherein in a case where the number of times that the power source is turned on exceeds a predetermined number of times, the processor decides that installation of the projection apparatus is completed.

13. The projection apparatus according to claim 2, wherein in a case where an integrated projection time which is taken after acceptance of the final installation-related setting exceeds a predetermined time, the processor decides that installation of the projection apparatus is completed.

14. The projection apparatus according to claim 2, wherein in a case where the number of times that the power source is turned on which is obtained after acceptance of the final installation-related setting exceeds a predetermined number of times, the processor decides that installation of the projection apparatus is completed.

15. The projection apparatus according to claim 13, wherein the installation-related settings include at least one of a keystone correction setting, a ceiling-suspension setting, a rear projection setting, a digital screen shift setting, a zoom setting, a focus setting and an installation environment setting.

16. The projection apparatus according to claim 14, wherein the installation-related settings include at least one of a keystone correction setting, a ceiling-suspension setting, a rear projection setting, a digital screen shift setting, a zoom setting, a focus setting and an installation environment setting.

17. A method of detecting an installed state of a projection apparatus which includes at least one processor and a notification device, comprising:

registering a deformation parameter for a projected image which is set at a timing that an initial setting is made, as an initial value;

in a case where the deformation parameter is adjusted by a user operation at a timing which comes after the timing that the initial setting is made, deciding whether an adjustment degree that the deformation parameter is adjusted from the initial value reaches a first threshold value; and in a case where the adjustment degree reaches the first threshold value, controlling the notification device to notice a warning at the predetermined timing.

18. A non-transitory computer readable medium in which a program used for controlling a computer of a projection apparatus wherein the program for making a computer execute the procedures of:

registering a deformation parameter for a projected image which is set at a timing that an initial setting is made, as an initial value;

in a case where the deformation parameter is adjusted by a user operation at a timing which comes after the timing that the initial setting is made, deciding whether an adjustment degree that the deformation parameter is adjusted from the initial value reaches a first threshold value; and in a case where the adjustment degree reaches the first threshold value, noticing a warning at the predetermined timing.

* * * * *